E. MILLER.
CHAIN-PUMP BUCKET.

No. 190,889. Patented May 15, 1877.

Attest:
Jno. P. Brooks.
C. A. Snow

Inventor:
Edward Miller,
by Louis Bagger & Co.
Attys.

UNITED STATES PATENT OFFICE.

EDWARD MILLER, OF MACON CITY, MISSOURI.

IMPROVEMENT IN CHAIN-PUMP BUCKETS.

Specification forming part of Letters Patent No. 190,889, dated May 15, 1877; application filed April 17, 1877.

*To all whom it may concern:*

Be it known that I, EDWARD MILLER, of Macon City, in the county of Macon and State of Missouri, have invented certain new and useful Improvements in Chain-Pump Buckets; and I do hereby declare that the following is a full, clear, and exact description thereof, which will enable others skilled in the art to which it appertains to make and use the same, reference being had to the accompanying drawings, which form a part of this specification, and in which—

Figure 1:
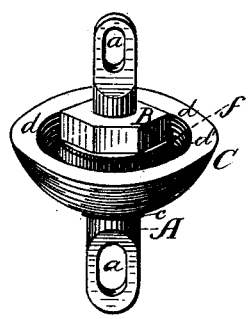
Figure 2:
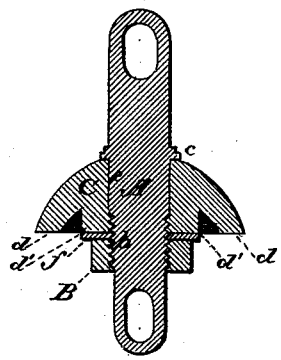

Figure 1 is a perspective bottom view, and Fig. 2 is a vertical transverse section.

Similar letters of reference indicate corresponding parts in both the figures.

This invention relates to certain improvements in chain-pump buckets; and it consists in an improved construction of the rubber valve or disk itself, by which its periphery may be expanded, so as to fit in the tube of the pump without becoming hard, substantially as I shall now proceed more fully to describe.

In the drawing, A is the body of the link. This is made of metal, in one piece, and it has at each end an eye or perforation, $a$, for the connecting-links. The body A above the lower eye $a$ is screw-threaded, as shown at $b$, and at its upper end, below the upper eye, it has a circumferential flange, forming a permanent washer, $c$, against which the rubber C rests. The rubber body C is cup-shaped, its under side being flat, as is usually the case. In this flat surface $d$, at a little distance from the periphery, I cut a circumferential groove, $d'$. The body C has a central perforation, $e$, fitting upon the body A of the link.

In adjusting the rubber C upon the link, I first force its spherical surface up against the flange $c$. I then place a washer, $f$, against its under flat side, the washer $f$ fitting inside the groove $d'$; and I finally secure the whole in position by a tightening-nut, B, fitting upon screw-threads $b$. The washer $f$, when the nut is tightened, prevents the rubber from being twisted out of shape.

When the rubber disk is too small to fit in the tube of the pump with sufficient compactness, its periphery may be expanded by tightening nut B; and the groove $d'$ will then, by receiving the bulk of the rubber as it expands from the center, cause the periphery of the disk to expand without getting hard—an object which is of great importance, inasmuch as it reduces the friction of the disk against the tube of the pump to a minimum.

Another important advantage of my invention is this: that the body of the link A is made in one piece only. When the link is made in two pieces, screwed together, and clamping the rubber between them, it frequently happens that the twisting of the chain causes the pieces to come apart, thus precipitating the links and buckets into the well.

Having thus described my invention, I claim and desire to secure by Letters Patent of the United States—

The rubber disk for chain-pump buckets herein described, consisting of cup-shaped body C, having flat surface $d$ and circumferential groove $d'$, substantially as and for the purpose herein shown and specified.

In testimony that I claim the foregoing as my own I have hereto affixed my signature in presence of two witnesses.

EDWARD MILLER.

Witnesses:
WILLIAM EARL TOMLINSON,
CURTIS R. HAVERLY.